United States Patent
Sabelström

(10) Patent No.: US 7,726,952 B2
(45) Date of Patent: Jun. 1, 2010

(54) ARRANGEMENT AND METHOD FOR COMPRESSED AIR SYSTEMS IN VEHICLES

(75) Inventor: Mats Sabelström, Billdal (SE)

(73) Assignee: AB Volvo, Gothenburg (SE)

( * ) Notice: Subject to any disclaimer, the term of this patent is extended or adjusted under 35 U.S.C. 154(b) by 1222 days.

(21) Appl. No.: 11/161,451

(22) Filed: Aug. 3, 2005

(65) Prior Publication Data
US 2006/0112677 A1  Jun. 1, 2006

Related U.S. Application Data

(63) Continuation of application No. PCT/SE2004/000141, filed on Feb. 3, 2004.

(30) Foreign Application Priority Data
Feb. 3, 2003 (SE) .................................... 0300284

(51) Int. Cl.
   *F04B 49/06* (2006.01)
   *F04B 23/00* (2006.01)
(52) U.S. Cl. .................... 417/313; 422/110; 422/114
(58) Field of Classification Search .............. 417/313, 417/53; 422/110, 114; 423/245.3
   See application file for complete search history.

(56) References Cited

U.S. PATENT DOCUMENTS 5,182,086 A   1/1993  Henderson et al.
5,284,629 A * 2/1994  Henderson et al. .......... 422/171

FOREIGN PATENT DOCUMENTS

| DE | 19902052 A1 | 7/2000 |
|----|-------------|--------|
| GB | 2103593 A | 2/1983 |
| JP | 401186570 A * | 7/1989 |
| WO | WO 00/66251 | 11/2000 |
| WO | WO 02/060564 A1 | 8/2002 |

* cited by examiner

*Primary Examiner*—Charles G Freay
(74) *Attorney, Agent, or Firm*—Novak Druce + Quigg LLP

(57) ABSTRACT

Method and arrangement for providing a compressed air system in a vehicle that includes a connection (6, 10) for delivering compressed air from a compressor (2) to the rest of the compressed air system (1). An oxidation catalytic converter (9) is included that is designed to clean the compressed air and which is located along the connection (6, 10). The connection (6, 10) includes a line (10) that forms a connection between the oxidation catalytic converter (9) and the rest of the compressed air system. The invention also includes a valve (11) that is arranged upstream of the rest of the compressed air system (1) and that can be adjusted so that in a first position it will allow and in a second position will prevent the delivery of air to the rest of the compressed air system (1), depending on the operating condition of the compressor (2). The invention provides an improved system in which the risk of contaminated air being delivered to the compressed air system is minimized.

15 Claims, 4 Drawing Sheets

ARRANGEMENT AND METHOD FOR COMPRESSED AIR SYSTEMS IN VEHICLES

CROSS-REFERENCE TO RELATED APPLICATIONS

The present application is a continuation patent application of International Application No. PCT/SE2004/000141 filed 3 Feb. 2004 which was published in English pursuant to Article 21(2) of the Patent Cooperation Treaty, and which claims priority to Swedish Application No. 0300284-7 filed 3 Feb. 2003. Said applications are expressly incorporated herein by reference in their entireties.

BACKGROUND OF THE INVENTION

The invention relates to an arrangement for a compressed air system in a vehicle, and particularly those intended for use on heavier trucks. The invention also relates to a method for compressed air systems in vehicles.

BACKGROUND OF THE INVENTION

Certain vehicles, and particularly commercial type vehicles, are known to be provided with a compressed air systems for generating, storing and distributing compressed air to air suspension systems and brake systems, for example. Such systems include, in a known manner, pressurized tanks, compressed air lines and various types of valves, and the supplied systems are typically supplied with compressed air from a compressed air compressor. These types of compressors are usually driven in a known manner by means of the vehicle internal combustion engine. Conventionally, lubricating oil from the lubricating oil system of the internal combustion engine is used to lubricate the compressor.

The compressed air can be delivered from the compressor to the vehicle compressed air system. One problem that arises in such known compressed air systems stems from the fact that the compressed air that is generated in the compressor is often contaminated by lubricating oil in aerosol and gaseous form. When the compressor is in operation, a very high temperature occurs, which can result in oxidation of the lubricating oil mixed in with the compressed air, which can lead to polymerization of the oil and to the formation of aggressive oxidation products. Should these impurities be allowed to reach the rest of the vehicle compressed air system, deposits may be formed in components of the systems. These deposits can cause clogging and degrading of material in the components, which can in turn result in their malfunction.

According to known systems, the compressed air generated in the compressed air compressor can be cleaned by means of a mechanical filter combined with cooling. A disadvantage of this solution, however, is that it is not very efficient.

According to one solution which is demonstrated in the patent specification PCT/SE00/00638, use is made of a system having an oxidation catalytic converter designed for cleaning compressed air from a compressed air compressor. This oxidation catalytic converter is located along a connection between the compressor and the rest of the compressed air system of the vehicle. This permits an effective cleaning of the compressed air that is delivered by the compressor. This function is facilitated by the fact that the compressed air generated in the compressor normally reaches a very high temperature, at least in excess of approximately 200° C.; that is to say, a temperature that exceeds the temperature limit of the oxidation catalytic converter at which it is capable of functioning with satisfactory cleaning capacity.

It may be noted that a conventional compressed air compressor in a vehicle is used to generate a suitable system pressure, which is achieved in that it is activated when the pressure falls below a lower permitted system pressure limit. Furthermore, the system goes over to a relief phase when a certain upper limit for the system pressure is exceeded. As the system pressure fluctuates in line with the consumption of compressed air by various components in the compressed air system, the compressor will alternate between the active phase and the relief phase.

Although the system according to PCT/SE00/00638 in principle functions satisfactorily, it may be noted that a problem occurs when an oxidation catalytic converter is used to clean air from a compressed air compressor that is driven in such a way that it is allowed to pump air during the relief phase. This can in fact mean that it pumps air with a relatively low temperature, even below the ignition temperature of the catalytic converter. When the temperature of the catalytic converter falls below its ignition temperature it can no longer function with a satisfactory cleaning effect. This means that contaminated air can then reach the vehicle compressed air system and cause impaired operation and malfunctioning, as has been described above. The contaminated air may also mean that the surface of the catalytic converter becomes coated with oil, which reduces the cleaning capacity until such oil has been burned off.

When the compressor returns to its active phase again after the relief phase, it will therefore initially deliver contaminated air from the oxidation catalytic converter, which is naturally a disadvantage. This will continue until the temperature in the oxidation catalytic converter has risen to the point where this exceeds its ignition temperature in a manner that the deposited oil is burnt off from the oxidation catalytic converter and the air delivered to the compressed air system can again be cleaned.

SUMMARY OF THE INVENTION

The object of the present invention is to provide an improved arrangement for effective cleaning of compressed air in a compressed air system for vehicles, and in particular for a compressed air system in which the compressed air is generated by a compressor that is lubricated by lubricating oil from an internal combustion engine and in which the compressed air is cleaned by means of an oxidation catalytic converter.

The invention consists of an arrangement for a compressed air system in a vehicle, comprising (including, but not necessarily limited to) a connection for delivering compressed air from a compressor to the rest of the compressed air system. An oxidation catalytic converter is included that is designed to clean the compressed air and is located along the connection, and wherein the connection comprises a line that forms a connection between the oxidation catalytic converter and the rest of the compressed air system. The invention is characterized by the fact that it comprises a valve, which is arranged upstream of the rest of the compressed air system and can be adjusted so that in a first position it will allow, and in a second position will prevent, the delivery of air to the rest of the compressed air system depending on the operating condition of the compressor.

The invention also takes the form of a method for a compressed air system in a vehicle. The method includes delivering compressed air from a compressor to the rest of the compressed air system and cleaning the compressed air by means of an oxidation catalytic converter located between the compressor and the rest of the compressed air system. The method is characterized by the fact that it includes controlling an adjustable valve so that in a first position the valve allows air delivery and in a second position the valve prevents the delivery of air to the rest of the compressed air system depending on the operating condition of the compressor.

BRIEF DESCRIPTION OF THE DRAWING

The invention will be described in greater detail hereinbelow with reference to preferred embodiments that are illustrated in the accompanying FIGS. 1-4, which show schematic representations of arrangements configured according to the teachings of the present invention.

DESCRIPTION OF THE PREFERRED EMBODIMENTS

Figure 1:
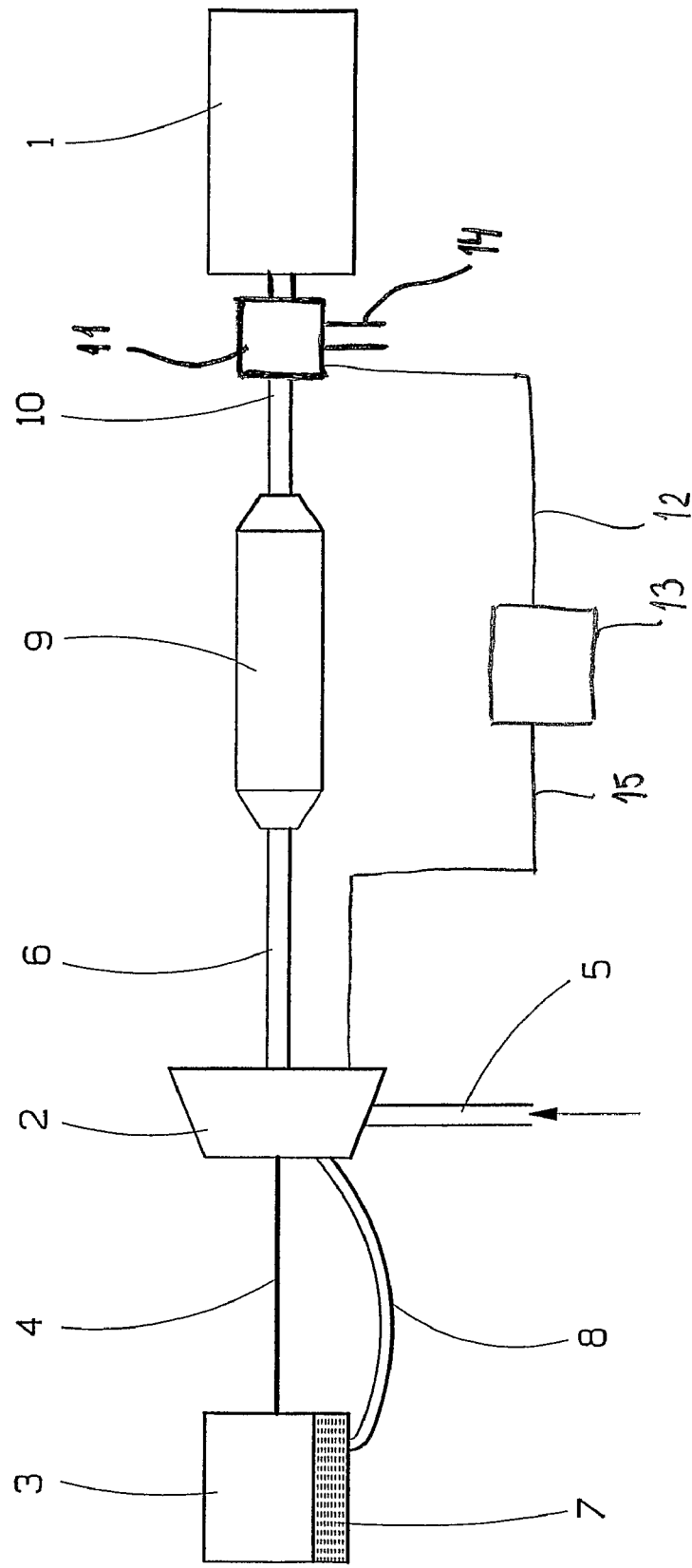

FIG. 1 shows a schematic representation of an arrangement configured according to the present invention. According to a preferred embodiment, the arrangement is used in connection with a compressed air system 1 of known design which may preferably but not exclusively consist of a compressed air system for a truck. The compressed air system 1 which comprises, for example, a pressurized tank and the vehicle air suspension system and brake system, is shown in highly simplified form in FIG. 1.

Compressed air in the compressed air system 1 is generated in a compressor 2, which is mechanically connected to an internal combustion engine 3 via a transmission 4. In this way the air flowing from the atmosphere (as indicated by an arrow in FIG. 1) to the compressor 2, via an inlet air line 5, is compressed and delivered in a line 6. The compressor 2 is supplied with lubricating oil from the lubricating oil system 7 of the internal combustion engine 3 via a separate line 8, which connects to the compressor 2. It is advantageous to incorporate the oxidation catalytic converter 9 into the top cover of the compressor making the line 6 very short.

The compressor 2 is designed to generate a suitable system pressure in the compressed air system 1. This is achieved in that the compressor 2 is activated for delivering compressed air when the pressure falls below a lower permitted system pressure limit and that it goes over to a relief phase when a certain upper limit for the system pressure is exceeded. Since the system pressure fluctuates as a function of the consumption of compressed air, the compressor 2 will therefore alternate between the active phase and the relief phase.

When the compressor 2 is in operation, a very high temperature is generated therein which causes oxidation of the lubricating oil mixed in with the compressed air. The aggressive oxidation products, such as esters, resinous substances and aerosols formed as a result can contaminate the compressed air generated in the compressor 2. If this contaminated compressed air should be delivered to the compressed air system 1, this could lead to the formation of deposits on pressurized tanks and the like, the clogging of valves and degrading of material. For this reason the contaminated compressed air from the compressor 2 is led to an oxidation catalytic converter 9, via the line 6 which is connected from the compressor 2. In the oxidation catalytic converter 9, the impurities included in the compressed air are converted to carbon dioxide and water. The cleaned compressed air is thereafter delivered to the compressed air system 1 by means of a further line 10.

The oxidation catalytic converter 9 is designed so that it has a certain minimum temperature limit at which it is capable of functioning with satisfactory cleaning capacity. This temperature limit is normally on the order of approximately 200° C. In order to ensure the desired temperature limit, the invention can be designed so that the oxidation catalytic converter 9 includes a heating means. This can in turn be achieved by designing the oxidation catalytic converter 9 with an electrical heating device 24 so as to ensure that the required temperature in the oxidation catalytic converter 9 can be reached.

It may be noted, however, that in normal operation of the compressor 2 the correct working temperature is attained in the oxidation catalytic converter 9 without any separate heating device, since the compressed air generated in the compressor 2 reaches a very high temperature.

In the light of the aforementioned problem of contaminated air possibly being delivered from the compressor, it is a basic underlying principle of the invention that it should comprise a controllable valve, more specifically a discharge valve 11, which is arranged between the oxidation catalytic converter 9 and the compressed air system 1. More specifically, the discharge valve 11 is of a type known in the art which can be controlled via a connection 12 to a control unit 13, which is suitably computer-based. The control unit 13 is only indicated schematically in FIG. 1, and in an actual application may consist of an existing control unit on a vehicle, such as is used, for example, for controlling components of the compressed air system 1 and which can be made to cover additional functions relating to the control of the aforementioned discharge valve 11.

According to the invention, the control unit 13 is designed to control the discharge valve 11 depending on the functioning and the operating condition of the compressor 2. More specifically, this control is undertaken in such a way that air from the compressor 2 can be led to an outlet line 14 of the discharge valve 11. The outlet line 14 is in turn connected to the surrounding atmosphere. According to the invention, the discharge of air to the atmosphere via the outlet line 14 occurs when the air from the compressor 2 can be expected to be contaminated, which can occur, for example, when the compressor 2 is in its relief phase and is generating relatively cool air for the oxidation catalytic converter 9. As stated above, this may mean that the temperature of the oxidation catalytic converter 9 falls below its temperature limit for an optimum cleaning function.

According to a preferred embodiment of the invention, the control unit 13 is connected to the compressor 2 via a further line 15. In this way the control unit 13 has information on the times at which a relief phase of the compressor 2 commences and finishes. This in turn means that the control unit 13 can be designed so that it can control the discharge valve 11 as a function of the occurrence of relief phases of the compressor 2. If the period of time for a certain relief phase is relatively short (which can therefore be detected by the control unit 13), the air from the compressor 2 will not cool significantly. For this reason the discharge valve 11 is not activated, so that inlet air is not led out via the outlet line 14, since there is then no risk of impurities being entrained by the air from the compressor 2. Thus the discharge valve 11 will not be activated in a relief phase that lasts for a period of time less than a certain lower limit value. Conversely, if the relief phase of the compressor 2 lasts for a certain period of time that exceeds a certain upper limit value, the discharge valve 11 will be activated. Since it may be expected in such a situation that contaminated air will be delivered from the oxidation catalytic converter 9, the discharge valve 11 will therefore be set to a position in which this contaminated air is discharged out into the atmosphere via the outlet line 14.

It may be stated therefore that the invention is based on an adjustable discharge valve 11 which can be activated with an opening time which varies as a function of the duration of the relief phase. A certain period of time for the relief phase (which exceeds said upper limit) will then be matched by a certain time for opening of the discharge valve 11.

According to an alternative and more simple embodiment of the invention, the discharge valve need not be adjustable but can be set to its active position (so that inlet air is led out via the outlet line) each time that the compressor 2 goes over to its relief phase. Such a discharge valve can then be set to its active position for a certain predefined, suitable period of time. This period of time is then set to a value which as precisely as possible reflects the fact that the contaminated air, which is delivered for a normal, anticipated period of time for the relief phase of the compressor 2, does not reach the compressed air system 1. In this alternative embodiment also, therefore, the working of the discharge valve is controlled depending on the operating condition of the compressor 2; more specifically, as a function of whether or not the compressor 2 is in its relief phase.

Figure 2:
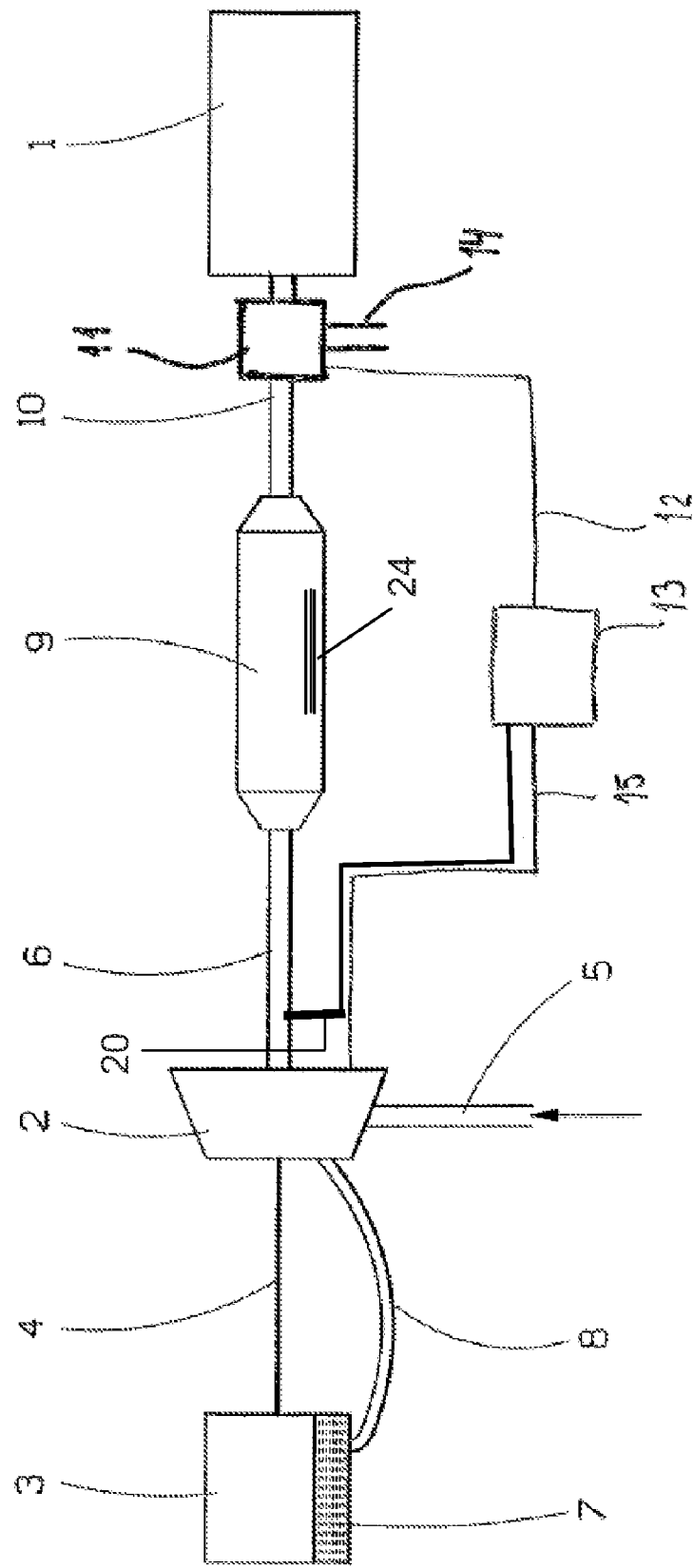
Figure 3:
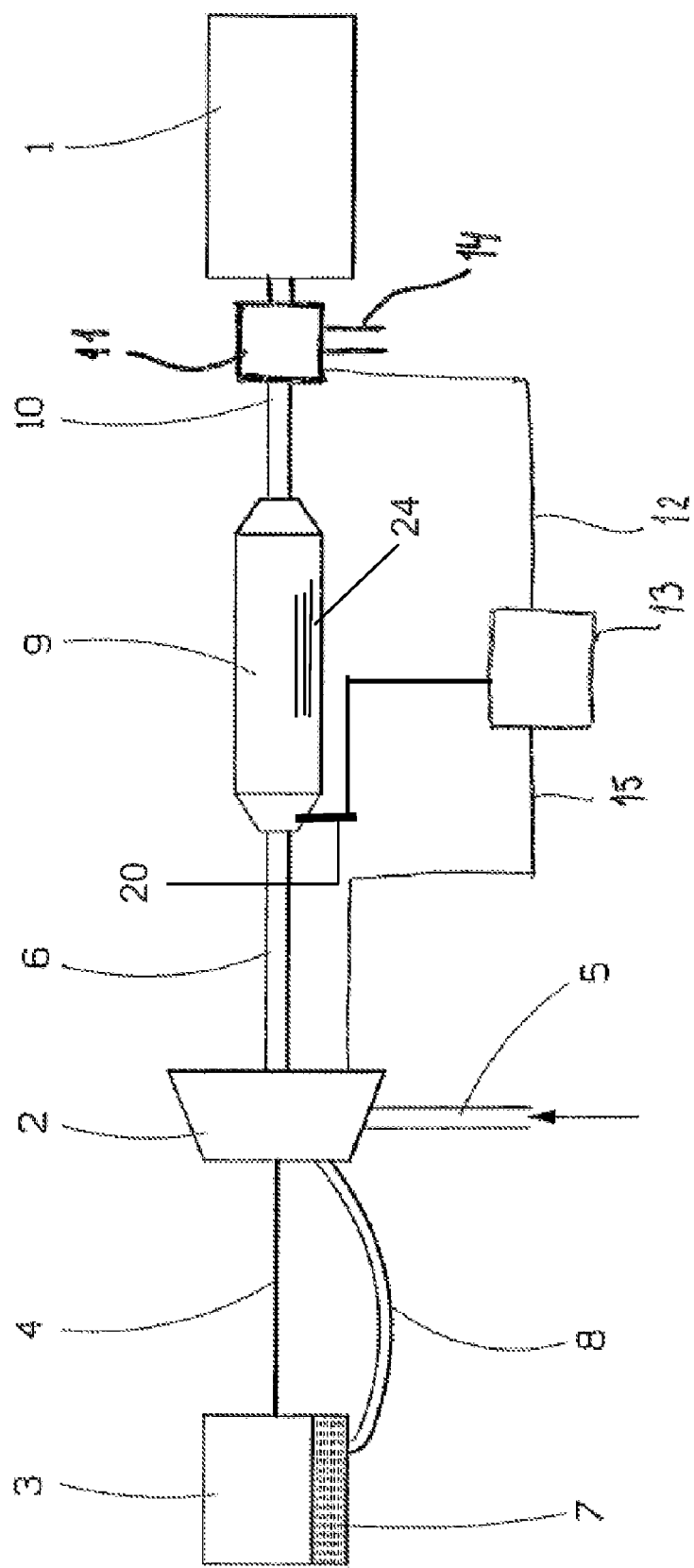

In another preferred embodiment of the invention, the control unit 13 is designed to detect the temperature in the inlet air to the oxidation catalytic converter 9. When the temperature of the inlet air is less than a certain predefined temperature, for example the temperature limit of the oxidation catalytic converter, the control unit 13 controls the discharge valve 11 so that the air is led to the outlet line 14. The temperature can be measured, for example, in the line 6 (FIG. 2) or in the inlet to the oxidation catalytic converter (FIG. 3). The temperature is detected by a suitable temperature sensor 20 such as an NTC or PTC element. When the temperature of the inlet air exceeds the predefined temperature, the control unit 13 controls the discharge valve 11 so that the air is led to the compressed air system 1.

Figure 4:
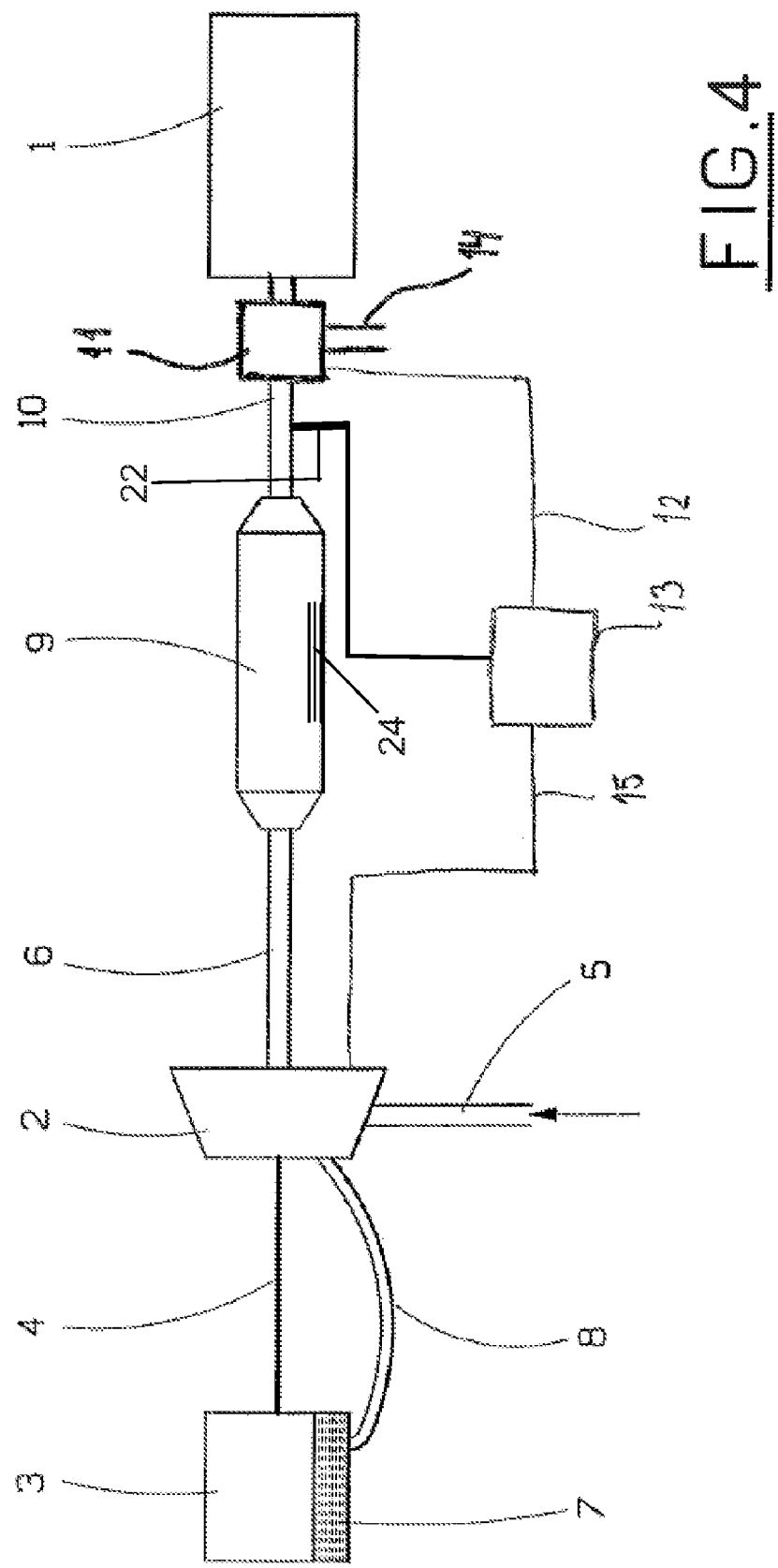

In another preferred embodiment of the invention, the control unit 13 is designed to detect the content of impurities in the air from the oxidation catalytic converter 9. This is done, for example, by means of a sensor 22 located in the line 10 (FIG. 4). A suitable sensor 22, for example, may be an HC sensor. When the content of impurities exceeds a predefined level, the control unit 13 controls the discharge valve 11, so that the air is led to the outlet line 14.

According to the invention, the utilized compressor 2 is of the type that is driven by means of an internal combustion engine 3, more specifically via a mechanical connection in the form of a transmission 4, which in a known manner may consist, for example, of a geared or belt transmission. The compressor 2 according to the invention therefore constitutes a component which is functionally separated from the internal combustion engine 3 and which is moreover supplied with lubricating oil from the lubricating oil system of the internal combustion engine 3, the lubricating oil being delivered via a line 8, which extends from the internal combustion engine 3 to the compressor 2. This fundamental principle on which the invention is based therefore differs, for example, from the known systems which use one or more cylinders of an internal combustion engine to generate compressed air, which in contrast to the present invention, can be done by using the piston movements in the engine. The compressor 2 according to the invention may be physically mounted on or in proximity to the internal combustion engine 3, but its function is accordingly separated from the valve and piston mechanisms in cylinders of the internal combustion engine 3.

The invention is not limited to the embodiment described above, but can be modified within the scope of the patent claims. For example, the invention can be used in various types of vehicles such as passenger cars, trucks, loaders and buses and which include a compressor and an oxidation catalytic converter for respectively generating and cleaning compressed air for a compressed air system.

What is claimed is:

1. An arrangement for a compressed air system in a vehicle, comprising
    a connection (6, 10) for delivering compressed air from a compressor (2) to the rest of the compressed air system (1), said compressor having a relief phase of operation, and
    an oxidation catalytic converter (9), which cleans the compressed air and which is located along said connection (6, 10),
    wherein said connection (6, 10) comprises a line (10) which forms a connection between the oxidation catalytic converter (9) and the rest of the compressed air system,
    wherein a valve (11) is provided upstream of the rest of the compressed air system (1), said valve (11) having a first position in which said valve will allow air delivery from said compressor to the rest of the compressed air system and a second position in which said valve will prevent delivery of air to the rest of the compressed air system (1), and
    wherein said valve (11) is operationally connected to and controlled by a control unit (13) which is, in turn, operationally connected to said compressor (2), said control unit (13) determining whether the compressor (2) is in its relief phase and setting the valve (11) to said first or said second position based on that determination.

2. The arrangement as recited in claim 1, wherein said control unit (13) sets the valve (11) to said second position for a period of time, which in turn varies as a function of a period of time during which said relief phase prevails.

3. The arrangement as recited in claim 1, wherein said control unit (13) sets the valve (11) to said second position for a predetermined period of time when it is detected that said relief phase prevails.

4. The arrangement as recited in claim 1, wherein said control unit (13) is operationally connected to a temperature sensor that detects the temperature of the air going to the oxidation catalytic converter (9), the temperature of the air going to the oxidation catalytic converter (9) being used to set the valve (11) to said first position or said second position.

5. The arrangement as recited in claim 1, wherein said control unit (13) is operationally connected to a gas sensor that detects the content of impurities in the air coming from the oxidation catalytic converter (9), the content of impurities being used to set the valve (11) to said first or said second position.

6. The arrangement as recited in claim 1, wherein an electrical heating device is provided at a position sufficient to heat said oxidation catalytic converter (9).

7. A method for providing a compressed air system (1) in a vehicles comprising:
    delivering compressed air from a compressor (2) to the rest of the compressed air system, said compressor having a relief phase of operation, and
    cleaning the compressed air by means of an oxidation catalytic converter (9) located between said compressor and the rest of the compressed air system,
    wherein a determination is made as to whether the compressor (2) is in its relief phase and an adjustable valve (11) is controlled based on said determination so that in a first position said adjustable valve (11) will allow air delivery and in a second position said adjustable valve (11) will prevent the delivery of air to the rest of the compressed air system (1).

8. The method as recited in claim 7, further comprising determining a first period of time during which said relief phase prevails and setting the valve (11) to said second position for a second period of time which, in turn, varies as a function of said first period of time.

9. The method as recited in claim 7, further comprising detecting whether said relief phase prevails and setting the valve (11) to said second position for a predetermined period of time when it is determined that said relief phase prevails.

10. An arrangement for providing compressed air in a vehicle, said arrangement comprising:
- a compressor (2) connected to a compressed air system (1) by a connection (6, 10) and delivering compressed air from the compressor (2) to the compressed air system (1), said compressor having a relief phase of operation;
- an oxidation catalytic converter (9) that cleans the compressed air, said oxidation catalytic converter (9) being located along said connection (6, 10) and said connection (6, 10) comprising a line (10) that forms a connection between the oxidation catalytic converter (9) and the compressed air system; and
- a valve (11) which is arranged upstream of the compressed air system (1) and which is adjustable between a first position that permits air delivery to the compressed air system (1) and a second position that prevents delivery of air to the compressed air system (1);

wherein said valve (11) is operationally connected to and controlled by a control unit (13) which is, in turn, operationally connected to said compressor (2), said control unit (13) determining whether the compressor (2) is in its relief phase and setting the valve (11) to said first or said second position based on that determination.

11. The arrangement as recited in claim 10, wherein said control unit (13) sets the valve (11) to said second position for a period of time that varies as a function of the period of time during which said relief phase prevails.

12. The arrangement as recited in claim 10, wherein said control unit (13) sets the valve (11) to said second position for a predetermined period of time when said relief phase prevails.

13. The arrangement as recited in claim 10, wherein said control unit (13) is operationally connected to a temperature sensor that detects the temperature of air going to the oxidation catalytic converter (9), said temperature of air going to the oxidation catalytic converter (9) being used to set the valve (11) to said first or to said second position.

14. The arrangement as recited in claim 10, wherein said control unit (13) is operationally connected to a gas sensor that detects the content of impurities in air coming from the oxidation catalytic converter (9), said content of impurities being used to set the valve (11) to said first or to said second position.

15. The arrangement as recited in claim 10, further comprising a heater located at a position sufficient to heat said oxidation catalytic converter (9).

* * * * *